Dec. 9, 1924.
F. HARRIS
1,518,423
TRAFFIC SIGNAL
Original Filed July 14, 1922   2 Sheets-Sheet 1
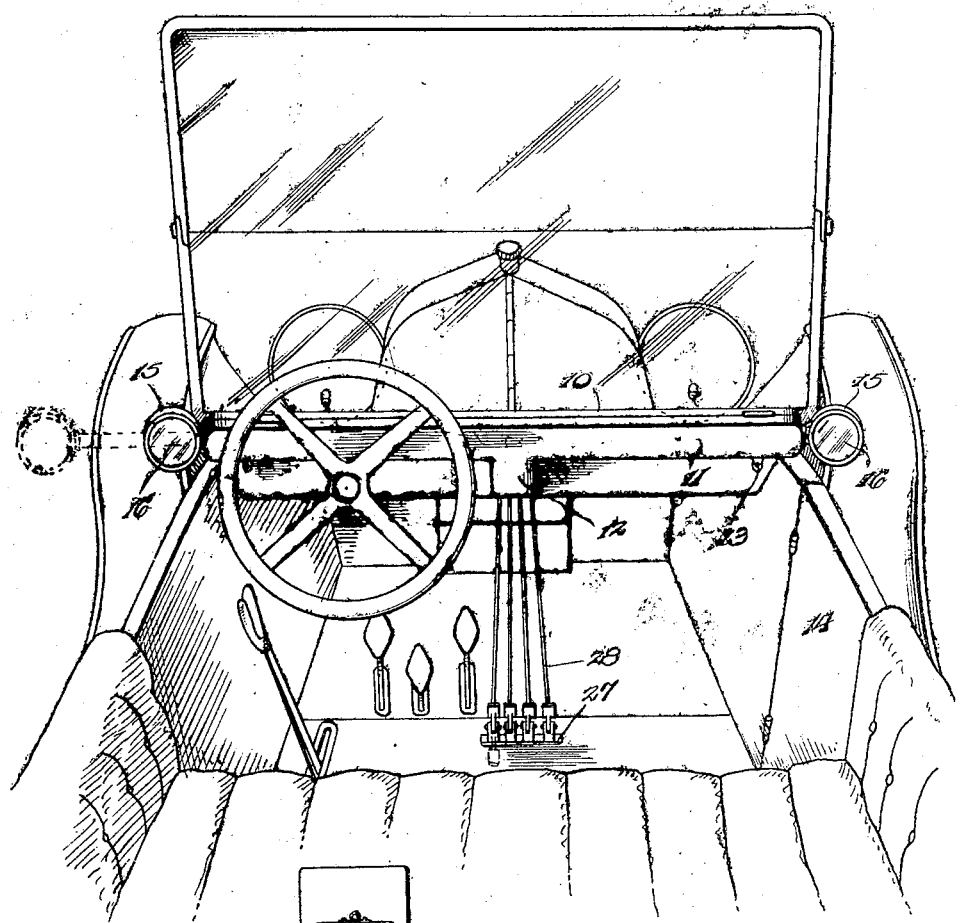
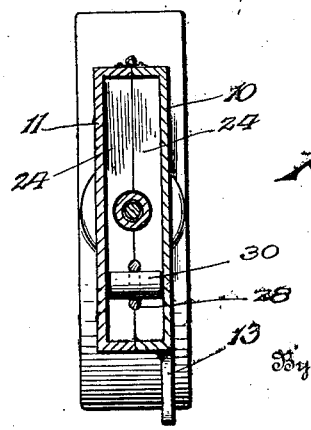
Inventor
F. Harris.
By Lacy & Lacy, Attorneys Dec. 9, 1924.                                              1,518,423
F. HARRIS
TRAFFIC SIGNAL
Original Filed July 14, 1922    2 Sheets-Sheet 2
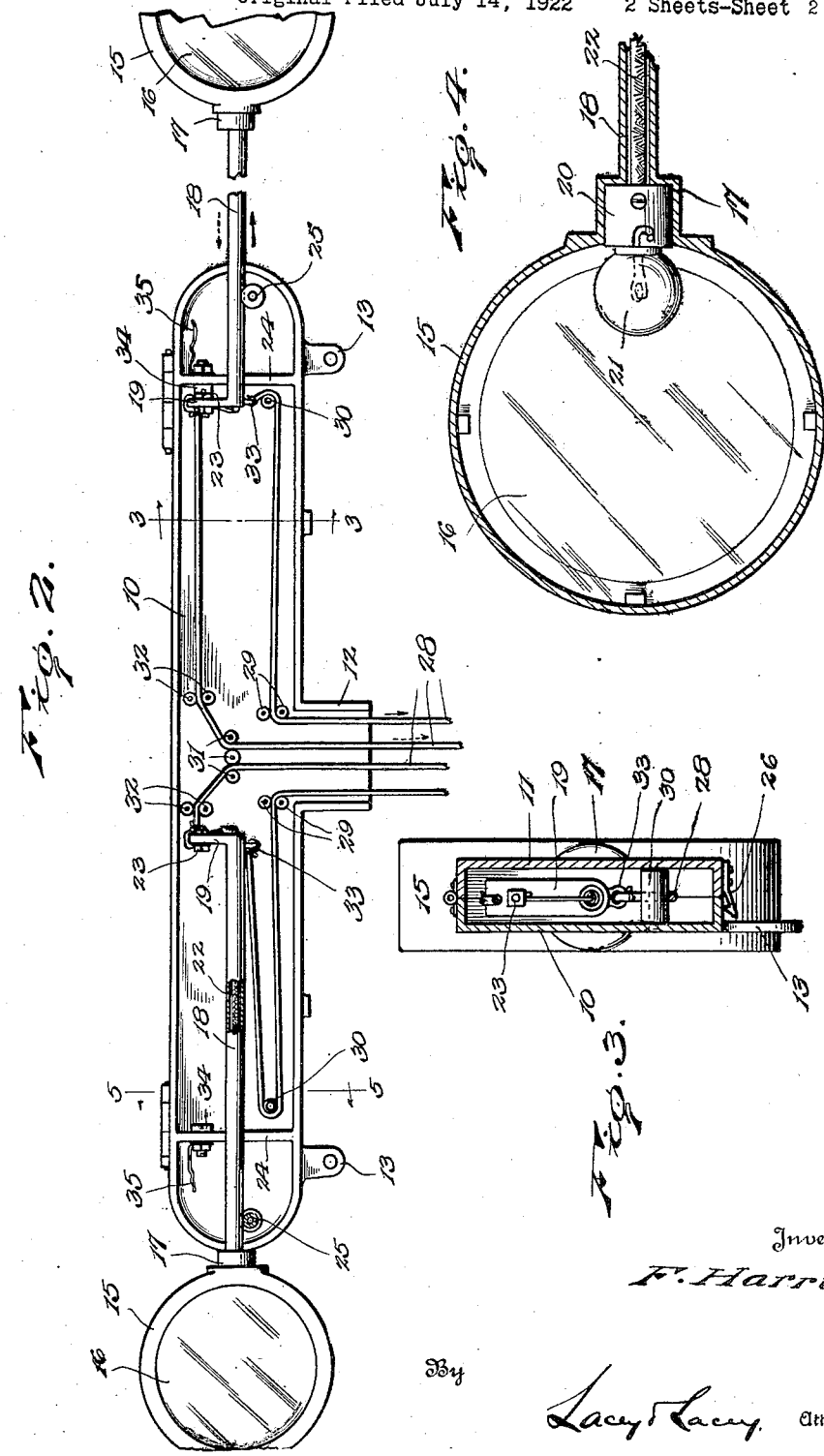
Inventor
F. Harris.
By
Lacy & Lacy, Attorneys Patented Dec. 9, 1924.

1,518,423

UNITED STATES PATENT OFFICE.

FRED HARRIS, OF YOUNGSTOWN, OHIO.

TRAFFIC SIGNAL.

Application filed July 14, 1922, Serial No. 574,969. Renewed October 13, 1924.

*To all whom it may concern:*

Be it known that I, FRED HARRIS, citizen of the United States, residing at Youngstown, in the county of Mahoning and State of Ohio, have invented certain new and useful Improvements in Traffic Signals, of which the following is a specification.

This invention relates to an improved traffic signal for motor vehicles and seeks, as one of its principal objects, to provide a device whereby a driver may conveniently indicate an intention to turn either to the right or left.

The invention has a further object to provide a device which may be mounted at the rear of the wind shield of a vehicle and which may be foot operated to project the indicators of the device.

And the invention has a still further object to provide a device which will be characterized by structural simplicity and which will be well adapted for use in connection with different makes of motor vehicles.

Other and incidental objects will appear hereinafter.

In the drawings:

Figure 1 is a perspective view showing my improved device in connection with a conventional motor vehicle, Figure 2 is a detail elevation of the device, the top section of the casing of the device being removed, Figure 3 is a transverse sectional view on the line 3—3 of Figure 2, looking in the direction of the arrows, Figure 4 is an enlarged sectional view showing the head of one of the indicators of the device, and Figure 5 is a transverse sectional view on the line 5—5 of Figure 2, looking in the direction of the arrows.

In carrying the invention into effect, I employ an oblong casing which is formed of companion hingedly connected sections 10 and 11 respectively, the section 10 providing a bottom section and the section 11 a top section. Formed on these sections at their lower edges are mating portions of a guide nipple 12 and depending from the bottom section are lugs 13 adapted to receive screws or other approved fastening devices therethrough securing the device in position upon a vehicle. In Figure 1, I have conventionally shown a motor vehicle at 14 and, as will be observed, the casing is arranged to extend transversely of the vehicle at the base of the wind shield, being secured to the instrument board or other convenient part of the vehicle at the rear of the wind shield. Slidably mounted upon the casing are companion indicators each including an annular head 15 closed by side panes 16 and provided at one side thereof with a boss 17. Extending from said boss is a tubular rod 18 provided at its inner end with a laterally directed arm 19 and mounted in the boss is an appropriate lamp socket 20 carrying a lamp 21 within the head. Extending from the socket through the rod 18 is a wire 22 which, at the inner end of the rod, is connected to a contact 23 upon the arm 19. The end walls of the sections 10 and 11 of the casing are notched to slidably support the rods 18 of the indicators therebetween and formed in the sections near their ends are mating cross webs 24 which, as shown in Figure 5, are also notched to slidably receive the rods therebetween, rollers 25 being mounted upon the bottom section 10 between the cross webs 24 and the end walls of the sections to bear beneath the rods. Thus, the indicators will be supported upon the casing for free endwise movement while, at the same time, said indicators may be removed by simply swinging the top section 11 of the casing to open position, when the indicators will be freed. Normally holding the top section tightly closed are, as shown in Figure 3, catches 26.

Mounted upon the floor of the vehicle are, as shown in Figure 1, a plurality of pivoted foot levers 27 and connected to said levers are cords or other suitable flexible elements 28. Mounted upon the bottom section 10 of the casing, at opposite sides of the nipple 12, are pairs of rollers 29 and mounted on said section near its ends are similar rollers 30. The bottom section further carries above the pairs of rollers 29, a series of three coacting rollers 31, above which are arranged pairs of rollers 32. As will be observed, there are two pairs of the cords 28 and corresponding cords of each pair are passed between the rollers 29 and beneath the rollers 30, and formed on the rods 18 of the indicators, at their inner ends, are eyes 33 to which such cords are connected. The remaining cords are, as also brought out in Figure 2, passed between the rollers 31 and between the rollers 32 and are connected to the upper ends of the arms 19. Thus, as will be at once understood, the levers 27 may be rocked for projecting the indicators at the ends of the casing to signaling position, as shown at the left of Figure 2, and may be likewise operated for retracting the indicators. The driver may, accordingly, by projecting the desired indicator, readily signal an intention to turn either to the right or left. Mounted upon the cross webs 24 of the bottom section 10 of the casing are contacts 34 to which are connected feed wires 35 leading from a battery or other suitable source of electrical energy upon the vehicle. These contacts are disposed for engagement by the contacts 23 upon the arms 19 of the indicators so that when the indicators are projected, the lamps 21 will be energized for illuminating the heads of the indicators. The indicators, when in projected position, will thus be rendered conspicuous so that the device will prove entirely effective at night as well as in the day time.

Having thus described the invention, what is claimed as new is:

1. A traffic signal including a casing formed of mating hingedly connected sections abutting at their confronting edges, indicators removably confined between the confronting edges of the sections slidably supported thereby, means for projecting and retracting said indicators, and means locking the sections of the casing in abutting relation.

2. A traffic signal including a casing formed of mating sections abutting at their confronting edges and having mating cross webs therein, indicators confined between the confronting edges of the casing and said cross webs slidably supported thereby to project through the end walls of the casing, said end walls as well as said cross webs being notched to accommodate the indicators, and means for projecting or retracting the indicators.

3. A traffic signal including a casing formed of mating sections abutting at their confronting edges and having mating cross webs therein, indicators confined between the confronting edges of the casing, and said cross webs slidably supported thereby to project through the end walls of the casing, said end walls as well as said cross webs being notched to accommodate the indicators, cables connected to said indicators for projecting or retracting the indicators, and foot pedals for operating said cables.

4. A traffic signal including a casing formed of mating sections abutting at their confronting edges, rods confined between the confronting edges of the casing slidably supported thereby, heads upon the outer ends of said rods, arms upon the inner ends of the rods for limiting the rods in their outward longitudinal movement, and means for shifting the rods longitudinally.

In testimony whereof I affix my signature.

FRED HARRIS. [L. S.]